United States Patent
Fenton et al.

(10) Patent No.: US 6,618,004 B2
(45) Date of Patent: Sep. 9, 2003

(54) PRECISE POSITIONING SYSTEM FOR MOBILE GPS USERS

(75) Inventors: Patrick C. Fenton, Calgary (CA); Graham Purves, Cochrane (CA); Douglas Reid, Calgary (CA)

(73) Assignee: NovAtel, Inc., Calgary (CA)

( * ) Notice: Subject to any disclaimer, the term of this patent is extended or adjusted under 35 U.S.C. 154(b) by 0 days.

(21) Appl. No.: 09/850,210

(22) Filed: May 7, 2001

(65) Prior Publication Data

US 2001/0035840 A1 Nov. 1, 2001

Related U.S. Application Data

(60) Provisional application No. 60/202,744, filed on May 8, 2000.

(51) Int. Cl.[7] ............................................. G01S 5/14
(52) U.S. Cl. ............................................. 342/357.03
(58) Field of Search ................... 342/357.03; 701/215

(56) References Cited

U.S. PATENT DOCUMENTS

| | | | |
|---|---|---|---|
| 5,043,736 A | | 8/1991 | Darnell et al. |
| 5,268,695 A | | 12/1993 | Dentinger et al. |
| 5,323,322 A | * | 6/1994 | Mueller et al. .......... 342/357.03 |
| 5,390,124 A | * | 2/1995 | Kyrtsos ................. 342/357.03 |
| 5,477,458 A | | 12/1995 | Loomis |
| 5,523,763 A | | 6/1996 | Loomis |
| 5,568,152 A | | 10/1996 | Janky et al. |
| 5,638,077 A | * | 6/1997 | Martin .................. 342/357.03 |
| 5,680,140 A | | 10/1997 | Loomis |
| 5,872,539 A | | 2/1999 | Mullen |
| 5,899,957 A | | 5/1999 | Loomis |
| 5,938,721 A | | 8/1999 | Dussell et al. |
| 6,081,229 A | * | 6/2000 | Soliman et al. ........ 342/357.01 |
| 6,198,430 B1 | * | 3/2001 | Hwang et al. ......... 342/357.03 |
| 6,229,478 B1 | * | 5/2001 | Biacs et al. ............ 342/357.03 |
| 6,324,473 B1 | * | 11/2001 | Eschenbach ................ 701/215 |

FOREIGN PATENT DOCUMENTS

DE          4424412 A1      1/1996

OTHER PUBLICATIONS

Captain J. Raquet et al., Test of a 400 km × 600 km Network of Reference Receivers for Preceivers for Precise Kinematic Carrier–Phase Positioning in Norway, ION, Sep. 15–18, 1998.

Bryan Townsend et al., New Concepts for a Carrier Phase Based GPS Positioning Using a National Referene Station Network, ION, Jan. 1999, San Diego, CA.

Oscar L. Colombo et al., Resolving Carrier–Phase Ambiguities on the Fly, at More Than 100 km from Nearest Reference Site, With the Help of Ionospheric Tomography, ION GPS'99, Sep. 14–17, 1999, Nashville, TN.

\* cited by examiner

*Primary Examiner*—Thomas H. Tarcza
*Assistant Examiner*—F H Mull
(74) *Attorney, Agent, or Firm*—Cesari and McKenna, LLC

(57) ABSTRACT

Multiple geographically fixed reference stations, with precisely known locations, that each receive GPS signals send information to a central processing facility that generates a three dimension topographical gradient map or model of the differences between the known locations and the locations as calculated from the received GPS signals. GPS signals received by mobile users are communicated to the central processing facility whereupon the central processing facility, using the model, generates precise corrected locations of the mobile users which is sent back to the mobile users. The mobile users can use and display the locally generated position from the locally received GPS signals or the corrected position from the central processing facility.

16 Claims, 2 Drawing Sheets

PRECISE POSITIONING SYSTEM FOR MOBILE GPS USERS

CROSS-REFERENCE TO RELATED APPLICATIONS

The present application claims priority from U.S. Provisional Patent Application, of the same title as the present invention, Ser. No. 60/202,744, which was filed on May 8, 2000, by the same inventors. The provisional is hereby incorporated herein by reference.

BACKGROUND OF THE INVENTION

1. Field of the Invention

The present invention relates to calculating the geometric position of a mobile user based on signals from the orbiting GPS satellites. More particularly, the present invention relates to overcoming the inherent inaccuracies found in such positioning systems, even those using differential methods as applied to the GPS system.

2. Background Information

The Global Positioning System (GPS) has been known and used for a number of years and only a cursory review is included herein. The GPS system includes a number of orbiting satellites each of which contains data describing the satellite orbits. Time and phase differences among the satellite signals reaching a receiver are used to determine the position of the receiver. L-band signals and differential techniques are also available to help correct for inaccuracies due to the atmosphere. For example U.S. Pat. No. 5,323,322 ('322) to Mueller et al. describes a compensating differential GPS invention using fixed receivers at a known locations. That system provides for a central processing facility that accepts information from the satellites and the fixed receivers and broadcasts correction information to a user. The user can calculate its position by receiving the GPS satellite signals and using correction information from the central processing facility to determine its true geographical position within some tolerance. With the differential GPS, accuracies approaching one meter may be realized. However, as the distance from the fixed receivers and/or the central processing facility increases inaccuracies also increase.

U.S. Pat. No. 5,043,736 ('736) to Darnell et al. describes an earlier system using the cellular system for a base station to communicate with remote units where the base station provides the calculations that it then sends to the remote units.

In the present state of the art, a commercially available global positioning system (GPS) receiver is used to acquire signals from multiple GPS satellites and, from the data so obtained, calculate the geometric position of the user. Such a commercial system is inherently limited because of the accuracy of the signals provided by the GPS satellites, variable atmospheric conditions, and inherent system errors. Accordingly, the positional accuracy of the commercial GPS system is on the order of one meter. The present invention is directed to improving the positional accuracy of mobile GPS users

SUMMARY OF THE INVENTION

The foregoing objects are met in a differential positioning system for one or more mobile GPS users. The system includes a central processing facility and a plurality of reference stations with accurate geographic locations known to the central facility. The reference stations are arranged to receive GPS signals and communicate those received GPS signals to the central processing facility. The central processing facility then calculates the difference between the known accurate locations of the reference stations and their locations as derived from the GPS signals The central processing facility then generates correction data for the area associated with the locations of the reference units. Any mobile user in the region receives its GPS signals and sends those signals or its calculated location to the central processing facility. The central processing facility responds by sending to the mobile user its specific corrected location.

The system can be used to generate a mathematical, topographical model over the entire range covered by the reference stations and basically any mobile user within that area can be precisely positioned. In addition, the mobile user can generate a local error or offset from the last corrected position received and compare it to its received GPS signals and then use that offset in calculating its own position.

The above limitations are addressed and precise positioning of one or more mobile users is provided by a differential GPS system where a central processing facility communicates with the mobile user. The mobile user receives GPS signals that are available to it and sends measurements from the GPS signals to the central processing facility.

The central processing facility also communicates with a number of fixed stations, where the geographical locations of the stations are known. The stations also receive GPS signals, although not necessarily from the same satellites, and not necessarily from the same satellites communicating to the mobile users. The reference stations send measurement data derived from the satellite signals to the central processing facility. The central processing facility calculates the differences between the received measurement data and the known locations of the satellites and the references stations. An error model is calculated by the central processing facility. The mobile users receive GPS signal and derive measurement data therefrom that are sent to the central processing facility. The central processing facility using the error model determines a precise location of the mobile users which is then sent to the mobile users.

In an embodiment, the difference information may be used to generate a topographical model into which mobile users are placed, and therefrom correct positions of the mobile users may be calculated.

In other preferred embodiments, the mobile users might use the GPS signals to calculate their positions, and the mobile users may use the last position from the central processing facility to generate a local error that may be used to correct its calculated position.

Depending upon the temporal changes in the measurements and/or other factors that cause errors and the preciseness required by the mobile users, the central processing facility may update the mobile users positions on a regular time basis. Updating the positions more often will produce a more accurate position.

In an embodiment, the position of the mobile users may be presented on a map, as geographical coordinates, or as navigational guidance, e.g. including directional headings (northeast) or fifteen degrees, etc. The history of the positions may be stored and displayed.

Other features, objects and advantages will be apparent from the following detailed description of preferred embodiments thereof taken in conjunction with the accompanying drawings in which:

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
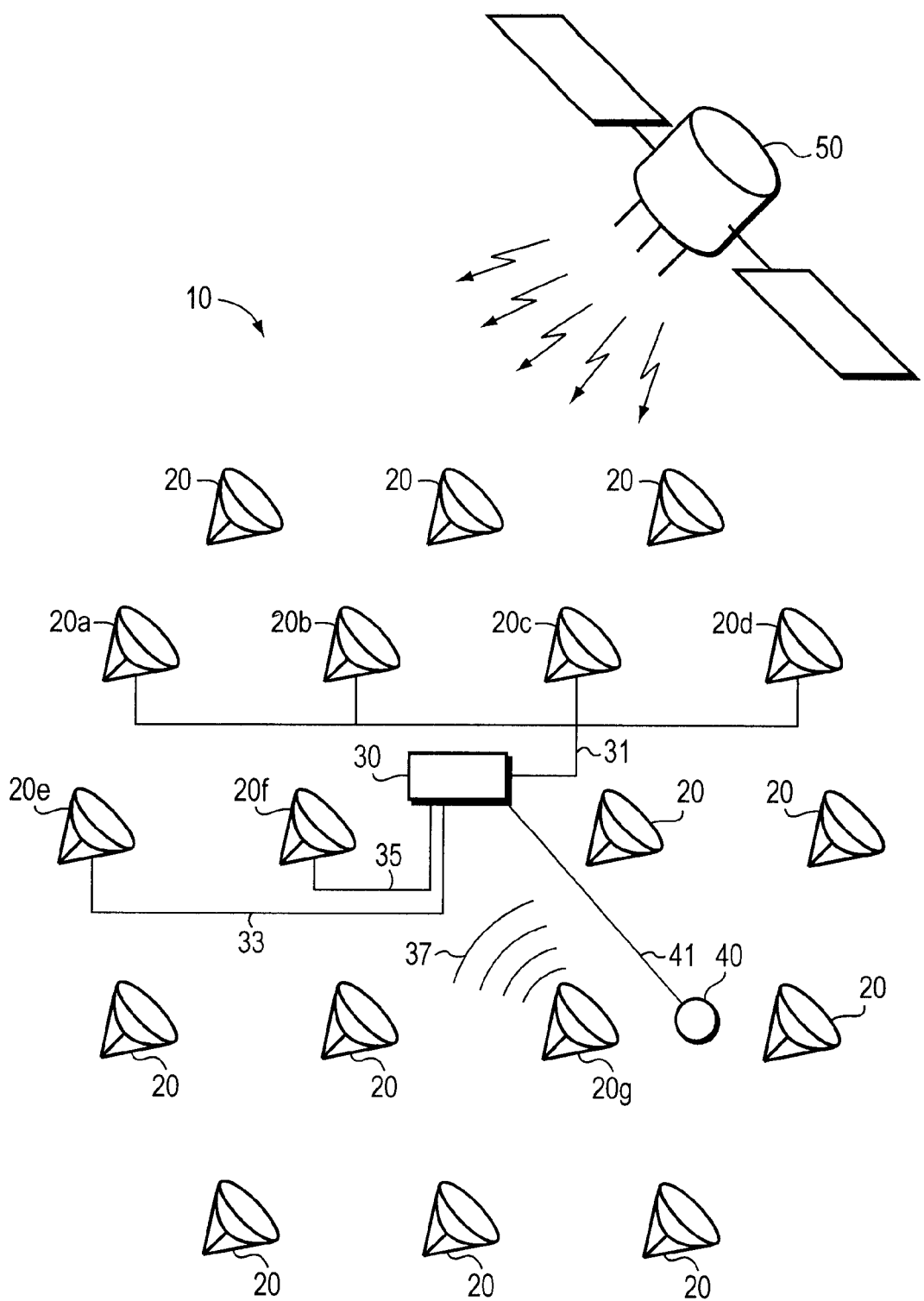
FIG. 1 is a diagrammatical plan view of a positioning system, in accordance with the present invention.

The present application discloses a positioning system 10 including an array of fixed reference stations 20 for receiving measurement signals from global positioning system (GPS) satellites, represented by a satellite 50. The signals may be acquired by any method known in the relevant art, including, for example, omnidirectional antennas or directional antennas. The measurement signals are converted into measurement data by the respective reference stations 20.

The positioning system 10 also includes a processing facility 30 to which are transmitted the measurement data acquired by each of the reference stations 20. The measurement data may be transmitted along a common transmission line 31 from a networked group of the reference stations 20, exemplified by reference stations 20a through 20d. Alternatively, one or more of the reference stations 20, such as reference stations 20e and 20f, may have dedicated transmission lines 33 and 35, respectively, for transmission of the measurement data to the processing facility 30. In yet another embodiment, the measurement data may be wirelessly transmitted from reference station 20g, as indicated by a radiating signal 37. The actual positions of the reference stations 20 are known to high degree of accuracy by the processing facility 30.

The positioning system 10 provides precise positioning data, in real time, to a plurality of subscribers at different levels of service. This is achieved by using: i) the known locations of the reference stations 20, ii) the measurement data provided on an ongoing basis by the reference stations 20 to the processing facility 30; and iii) measurement data provided to the processing facility 30 by the respective subscriber. A subscriber may, for example, choose to pay premium rates to obtain positional accuracy of 2 cm for surveying activity. On the other hand, another subscriber may find acceptable a less costly, less precise service providing positional accuracy of 10 to 15 cm. Each subscriber accesses the positioning system 10 by means of his own GPS receiver system 40. The GPS receiver system 40 communicates with the processing facility 30 by means of a two-way link 41, which may be a wired or a wireless communications system link.

Figure 2:
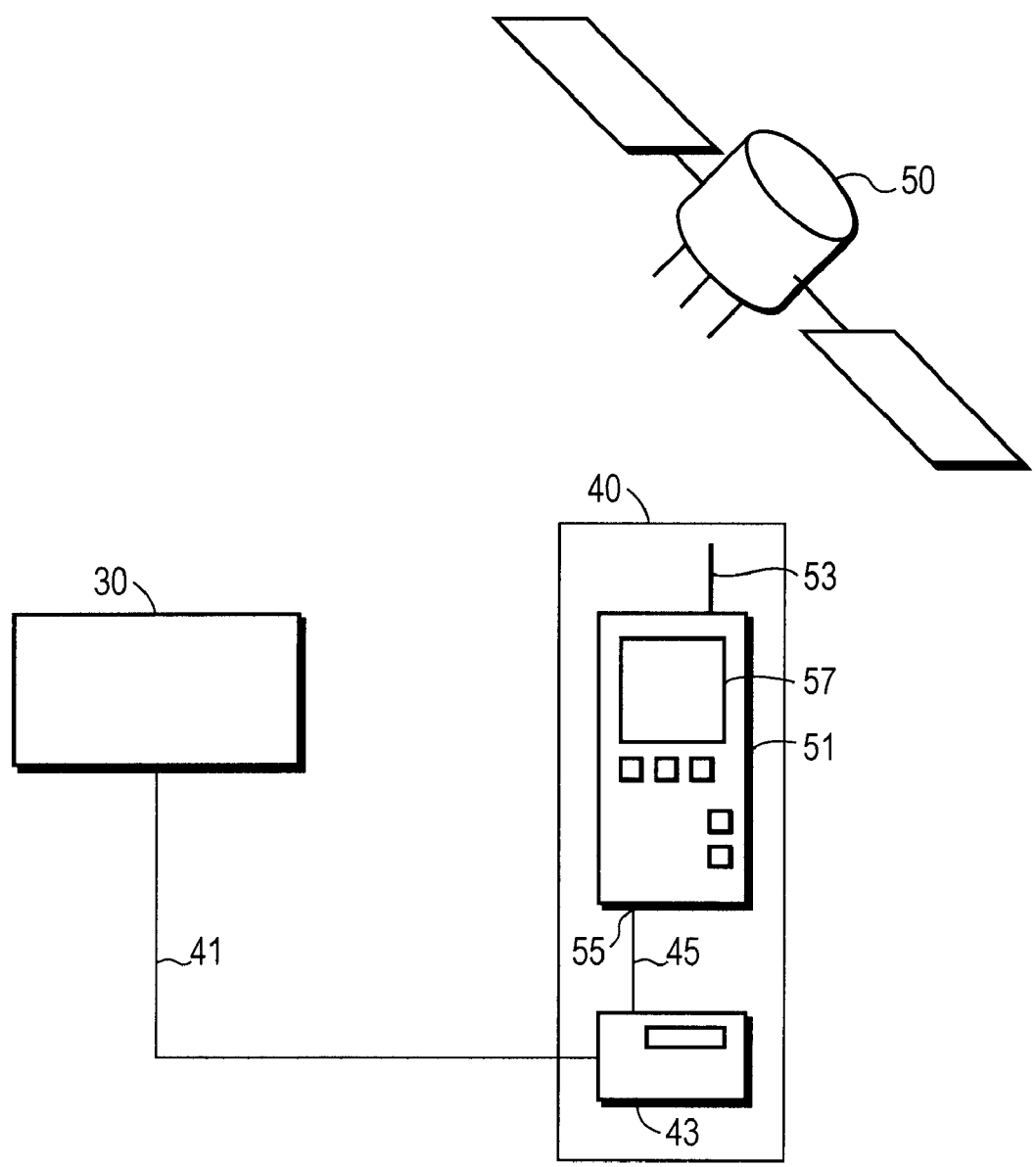
FIG. 2 is a diagrammatical view of a GPS receiver system used to access the positioning system of FIG. 1.

As shown in FIG. 2, the GPS receiver system 40 includes a mobile GPS receiver 51, which receives measurement data from the GPS satellites 50 via an antenna 53. A conventional mobile GPS receiver can provide the subscriber with positional data, but not with the desired positional accuracy available with the positioning system 10. To obtain the positional accuracy desired, the GPS receiver system 40 functions in conjunction with the positioning system 10.

The GPS receiver system 40 also includes a transceiver 43, which receives measurement data from and provides positional data to the mobile GPS receiver 51 by means of a communication link 45 connected to a data port 55 on the GPS receiver 51. The transceiver 43 also provides measurement data to and receives positional data from the processing facility 30 on the two-way link 41. The measurement data may include pseudoranges, carrier phase, satellite Doppler, clock information, signal strengths, and tracking status. The positioning system 10 provides the subscriber with positional data of the desired accuracy for display on a graphical user interface (GUI) 57.

During operation of the positioning system 10, measurement data is continuously acquired from the GPS satellites 50. The measurement data so obtained is processed by the processing facility 30 to yield a calculated geometric position for each respective reference station 20. As is well-known in the relevant art, the calculated positions of the reference stations 20 will differ from their actual geometric positions because of error sources such as tropospheric distortion, ionospheric distortion, satellite orbit, and clock error. Additional error may result from receiver and clock biases, and local multipath signals at one or more of the reference stations 20. As mentioned above, many of these error sources are temporal, therefor requiring constant updating.

The processing facility 30 uses the measurement data provided by the reference stations 20 to generate a mathematical model which accounts for the differences between the calculated positions of the reference stations 20 and their known positions. This model may take the form of, for example, a three-dimensional topographical gradient map. Preferably, the processing facility also models the GPS satellites 50.

The reference stations 20 continuously acquire the GPS satellite signals and send the resulting measurement data to the processing facility 30 at regular intervals so that the positional errors and the topographical gradient map can be continuously updated. Data processing and the computation of error models for all the error sources are performed by the processing facility 30. The duration of the measurement intervals is determined by the time variance of the fastest changing error source.

In a preferred embodiment, the processing facility 30 utilizes stored error models, reference station data, and network position computation algorithms to process the measurement data received from the GPS receiver system 40 of the mobile user and thereby precisely compute the location of the requesting subscriber. For an example of computational algorithms, see the paper by Requete et al., entitled *Test of a 400 km×600 km Network of Reference Receivers for Precise Kinematic Carrier-Phase Positioning in Norway*, Inst. Navigational Proc. Sep. 15–18, 1998, and the paper by Townsend et al., entitled *Resolving Carrier-Phase Ambiguities On the Fly, At More Than 100 km From Nearest Reference Site, With The Help Of Ionospheric Tomography*, ION GPS ''99,Sep. 14–17, 1999, both incorporated herein by reference. The subscriber's precise location is then sent to the subscriber via the two-way link 41 and displayed on the GUI 57 as geographical coordinates, a moving map display, or navigation guidance. If desired, the subscriber can also download a history of his computed positions from the processing facility 30 by using communications such as a web browser or file transfer protocol (FTP).

In a preferred embodiment, the GPS receiver 51 has no processing capabilities and merely provides acquired measurement data to the processing facility 30. This allows the GPS receiver 51 to be more compact and less costly than a conventional GPS receiver with processing capabilities. Moreover, by functioning in conjunction with the processing facility, the GPS receiver 51 acquires greater computational capabilities than if the processing were done at the subscriber's location.

In an alternative embodiment, the GPS receiver system 40 includes a conventional GPS receiver and an internal switch (not shown) for changing the display in the GUI 57 between the less accurate, conventional positional data and the more accurate positional data provided by the positioning system 10 as described above. This feature is useful when the two-way link 41 fails, or when the subscriber travels outside the range of the positioning system 10. In another preferred embodiment, the subscriber, or mobile user, may use its last correct position from the central processing facility, and generate a local correction with respect to the locally received GPS signal to calculate and offset or error that it then continues to apply when using only its locally received GPS signals for determining its position.

Preferably, the reference stations 20 are geographically arrayed in a regular pattern, such as a hexagonal gridwork. The resultant accuracy of the positioning system 10 is a function of the surface density of the reference station array. For example, a spacing of about 100 kilometers between the reference stations 20 will provide a positional accuracy of within 10 to 15 cm. The positional accuracy increases with increasing array density. For example, a spacing of about 10 kilometers between the reference stations 20 will increase the accuracy to within 2 cm.

What is claimed is:

1. A differential positioning system for at least one mobile GPS user comprising:
   a central processing facility,
   a plurality of reference stations with known geographic locations or positions,
   means for each reference station to receive GPS signal data,
   means for each reference station to communicate with the central processing facility, wherein measurement data are sent to the central processing facility where differences between the received measurement data and the known locations of the reference stations are calculated,
   an error model that is generated from the calculated differences, the error model covering at least the area including the central processor and all the reference stations,
   means for two way communicating between the at least one mobile user and the central processing facility,
   means for the mobile user to receive GPS signal data, wherein the mobile user sends measurement data to the central processing facility, and receives corrected positional data for the mobile user therefrom, wherein the central processor uses the error model to calculate the corrected positional data for the mobile user, and
   means for the mobile user to generate a local error or offset from the last corrected position received as compared to its received GPS signals and then to use this offset when the mobile user is calculating its own position from the locally received GPS signals.

2. The differential positioning system as defined in claim 1 wherein the measurement data includes pseudoranges, carrier phase, satellite Doppler, clock information, signal strength, and positioning data includes the corrected location of the at least one mobile user.

3. The differential positioning system as defined in claim 1 further comprising:
   means for generating a mathematical topographical model accounting for differences between the known locations of the reference stations and the locations derived from the GPS signals, and
   means for processing the information received from the at least one mobile user with respect to the mathematical topographical model wherein the position of the at least one mobile user is precisely computed and sent to the at least one mobile user.

4. The differential positioning system as defined in claim 1 further comprising:
   means for causing the reference stations to communicate with the central processing facility on a regular basis, wherein the central processing facility updates its difference calculations on the regular basis.

5. The differential positioning system as defined in claim 1 further comprising means for displaying the at least one mobile user's position as geographical coordinates, a moving map display, or as navigational guidance.

6. The differential positioning system as defined in claim 5 further comprising means for storing the calculated position history of the at least one mobile user to the at least one mobile user, and means for displaying the history at the at least one mobile user location.

7. The differential positioning system as defined in claim 1 further comprising a switch wherein, when the switch is set, the mobile user determines its position from its locally received GPS signals and does not use the positional data from the central processing facility.

8. The differential positioning system as defined in claim 1 further comprising means for the mobile user to determine its position from its locally received GPS signals.

9. A differential positioning method for at least one mobile GPS user comprising the steps of:
   determining known geographic locations or positions of a plurality of reference stations with,
   inputting the known geographical locations to a central processing facility,
   receiving GPS signal data at each reference station,
   communicating between each reference station and the central processing facility, wherein measurement data is sent from each reference station to the central processing facility,
   calculating differences between the received measurement data and the the known locations of the reference stations,
   generating an error model from the calculated differences, the error model covering at least the area including the central processor and all the reference stations,
   two way communicating between the at least one mobile user and the central processing facility, and
   receiving GPS signal data locally at the at least one mobile user,
   sending measurement data to the central processing facility, wherein the central processor uses the error model to calculate the corrected positional data for the mobile user, and
   receiving corrected positional data for the at least one mobile user from the central processing facility, and
   generating a local error or offset at the at least one mobile user from the last corrected position received as compared to its received GPS signals, and
   using the offset when the mobile user is calculating its own position from the locally received GPS signals.

10. The differential positioning method as defined in claim 9 wherein the measurement data includes pseudoranges, carrier phase, satellite Doppler, clock information, signal strength, and positioning data includes the corrected location of the at least one mobile user.

11. The differential positioning method as defined in claim 9 further comprising the steps of:
   generating a mathematical topographical model accounting for differences between the known locations of the reference stations and the locations derived from the GPS signals, and processing the information received from the at least one mobile user with respect to the mathematical topographical model wherein the position of the at least one mobile user is precisely computed and sent to the at least one mobile user.

12. The differential positioning method as defined in claim 9 further comprising the steps of:

causing the reference stations to communicate with the central processing facility on a regular basis, wherein the central processing facility updates its difference calculations on the regular basis.

13. The differential positioning method as defined in claim 9 further comprising the step of displaying the at least one mobile user's position as geographical coordinates, a moving map display, or as navigational guidance.

14. The differential positioning method as defined in claim 13 further comprising the steps of:

storing the calculated position history of the at least one mobile user to the at least one mobile user, and displaying the history at the at least one mobile user location.

15. The differential positioning method as claim 9 further comprising the step of determining the mobile user's position from its locally received GPS signals.

16. The differential positioning method as defined in claim 15, further comprising the step of selecting the locally generated position of the at least one mobile user or the correct position from the central processing facility.

* * * * *